US012042437B2

(12) United States Patent
Qiu

(10) Patent No.: US 12,042,437 B2
(45) Date of Patent: Jul. 23, 2024

(54) ONE SIDE BREATHING HOLE MASSAGE CUSHION

(71) Applicant: Qinglin Qiu, Broomfield, CO (US)

(72) Inventor: Qinglin Qiu, Denver, CO (US)

(73) Assignee: Qinglin Qiu, Broomfield, CO (US)

( * ) Notice: Subject to any disclaimer, the term of this patent is extended or adjusted under 35 U.S.C. 154(b) by 184 days.

(21) Appl. No.: 17/827,752

(22) Filed: May 29, 2022

(65) Prior Publication Data

US 2023/0398029 A1 Dec. 14, 2023

(51) Int. Cl.
*A61G 13/00* (2006.01)
*A61G 13/12* (2006.01)

(52) U.S. Cl.
CPC ......... *A61G 13/009* (2013.01); *A61G 13/121* (2013.01); *A61G 2200/325* (2013.01)

(58) Field of Classification Search
CPC ................ A61G 13/009; A61G 13/121; A61G 2200/325
See application file for complete search history.

(56) References Cited

U.S. PATENT DOCUMENTS

2004/0128774 A1* 7/2004 Chen ...................... A47C 23/14 5/725
2006/0112490 A1* 6/2006 Chausse ................. A61H 7/001 5/725
2017/0265640 A1* 9/2017 Du ........................... A47B 3/10
2020/0237616 A1* 7/2020 Tsukayama .......... A61G 13/009
2021/0138294 A1* 5/2021 Rocci ................... A61G 13/009
2023/0093733 A1* 3/2023 Du ....................... A61H 9/0078 601/148

* cited by examiner

*Primary Examiner* — Steven O Douglas
(74) *Attorney, Agent, or Firm* — Qinglin Qiu

(57) ABSTRACT

A massage cushion is provided, using a semi-solid foam board to be the a filler of the massage cushion, so we can open a breathing hole on one side of massage cushion, and open a ditch in the form of a horizontal air channel connected to the breathing hole. Accordingly, the fabric case of the massage cushion is opened into a breathing hole at the same location, and has two or three stainless steel airholes closer the outlet of air channel. In this manner, the massage cushion becomes one side breathing hole cushion, having one side for massage and the other side can be used for gym exercises.

3 Claims, 6 Drawing Sheets

ONE SIDE BREATHING HOLE MASSAGE CUSHION

BACKGROUND OF INVENTION

Thai massage has thousands of years long history, and Shiatsu massage was invented in 1920s. Both of them are operated on massage cushions. However, massage clients are not comfortable when in aprone position, because there is no breathing hole on the massage cushion. They have to twist their necks and often get neck sprains. So, it is necessary to design a new massage cushion with a breathing hole.

BRIEF SUMMARY OF INVENTION

This invention is to create a new massage cushion with a one side breathing hole, which can be used for Thai massage, Shiatsu massage and Ashiatsu massage, and also still can be used in Gym exercise.

An example of this invention is to use semi-solid Foam board as the filler(6, 7,8) of the massage cushion(10), such as a EPE foam board, because semi-solid foam board can be easier to be processed with mechanical tools. We design to cut a 4-inch round breathing hole (4) on the first filler (6) supporting the clients' upper body, and this 4-inch round hole is just a half deep round pit, instead of a through-hole. And also we correspondently open a 4-inch round hole on the first fabric case at the same location as the round pit on the filler(6). Next, from the upper side of filler (6), we open a 2-inch wide ditch (5) to connect the round pit (4), so that it becomes a horizontal air channel. At the top side of the fabric case (1), we assemble 2 or 3 stainless steel eyeholes (9) at the front of air channel outlets (5).

This kind of massage cushion only has breathing hole on one side of the massage cushion, so it not only can be used for Thai massage, Shiatsu massage, Ashiatsu massage, but the other side of the cushion can be used for gym exercise, or Yoga practice.

DETAILED DESCRIPTION OF THE INVENTION

Figure 1:
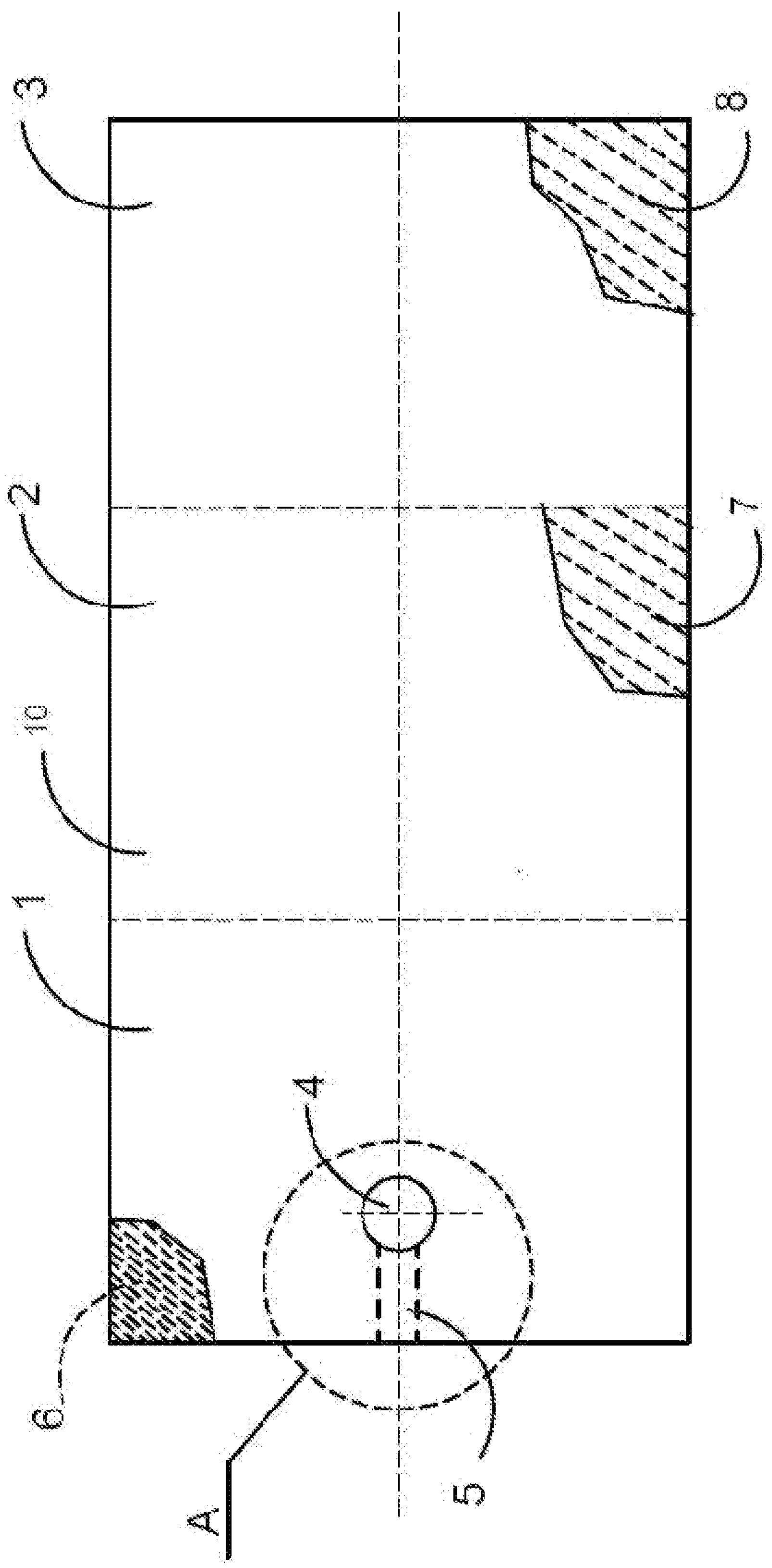
FIG. 1 is Top view of entire massage cushion
Figure 2:
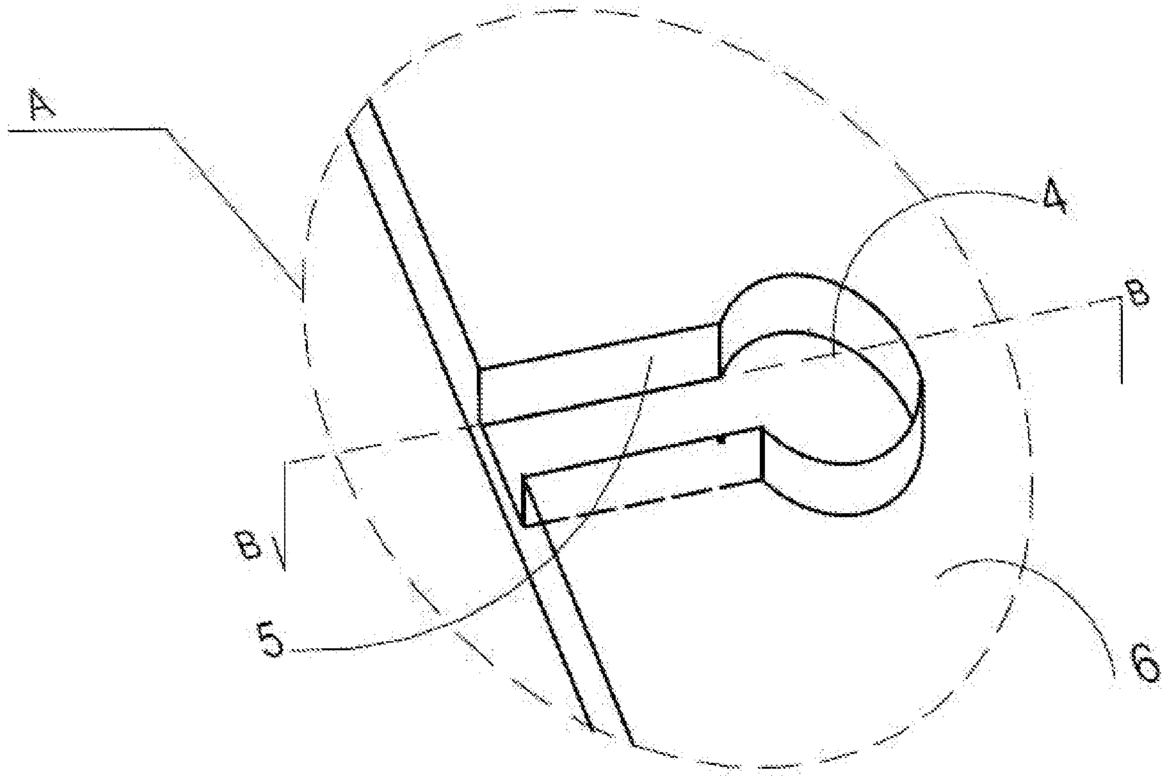
FIG. 2 is the isometric view of enlarged part A from FIG. 1
Figure 3:
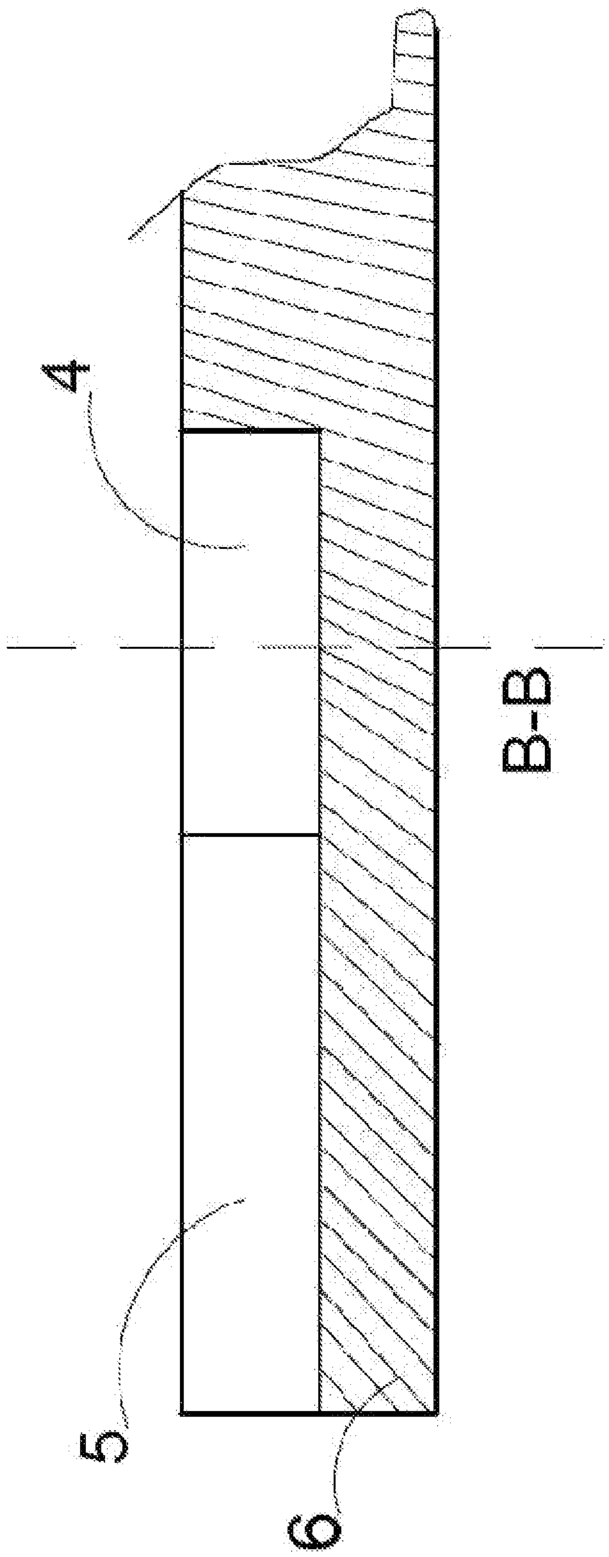
FIG. 3 is the transverse cross-section view taken along the line B-B in FIG. 2.
Figure 4:
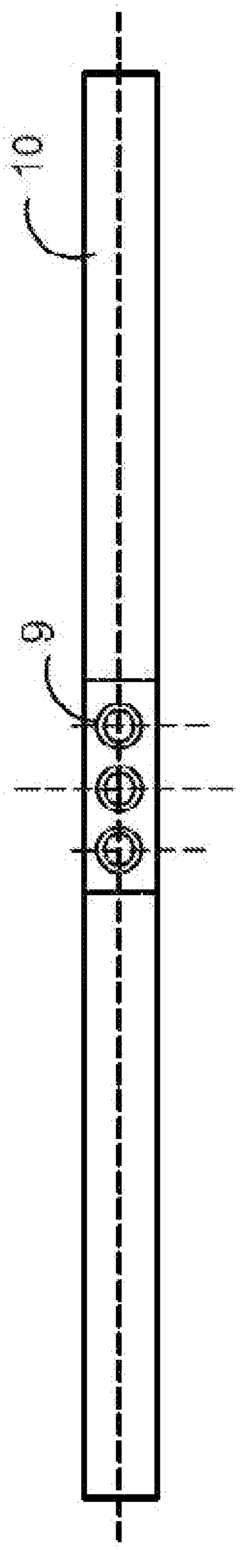
FIG. 4 is the side view of entire massage cushion
Figure 5:
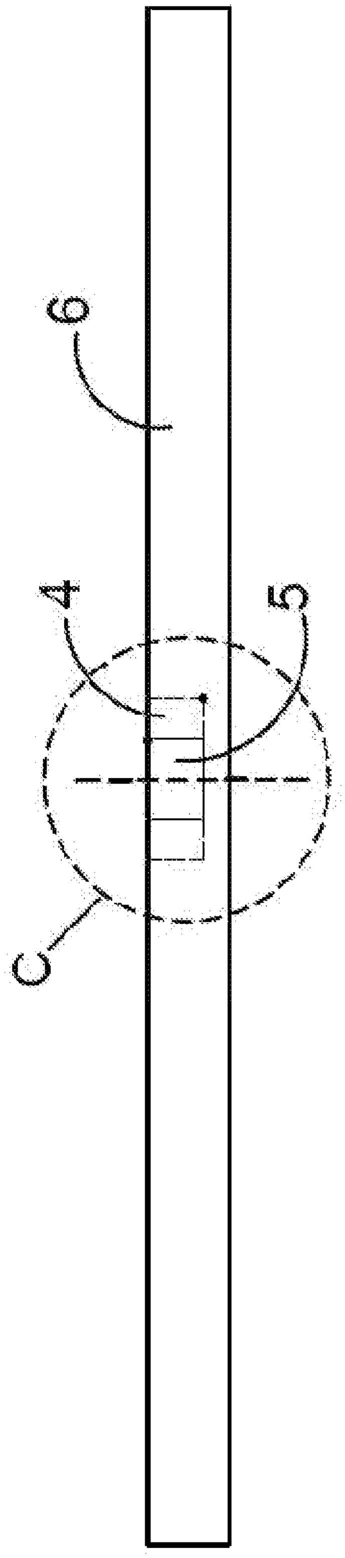
FIG. 5 is the side view of filler 6, after the fabric case taken off.
Figure 6:
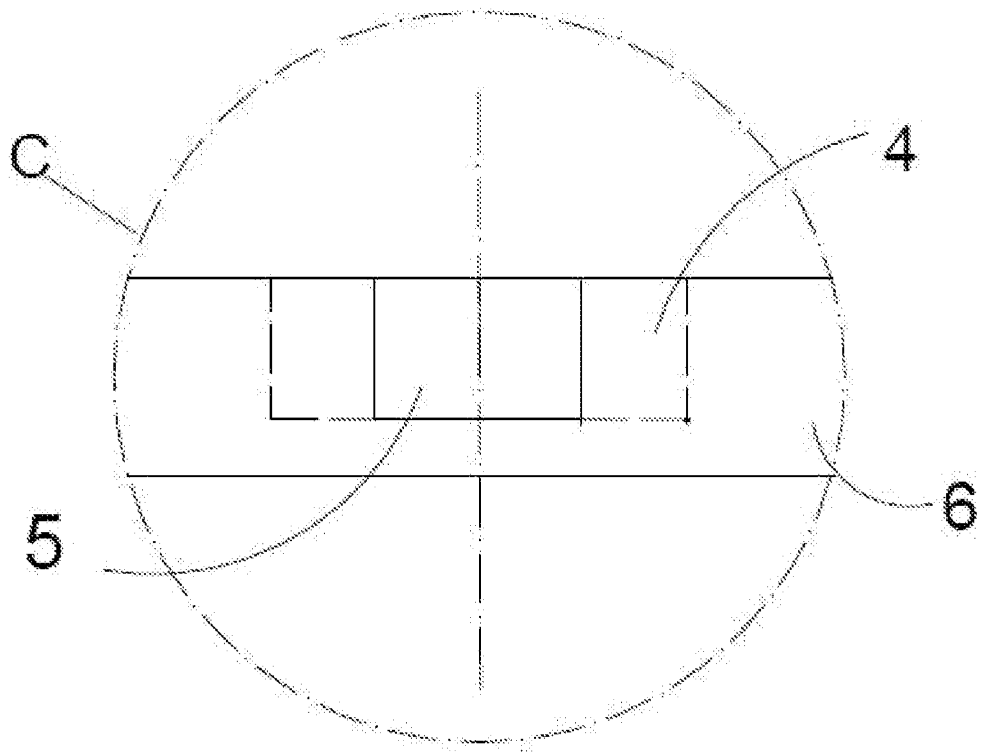
FIG. 6 the enlarged view of part C from FIG. 5

With reference now to the drawings, and in particular FIGS. 1 through 6, thereof, an example of the instant one side breathing hole massage cushion employing the principles and concepts of the present one side breathing hole massage cushion and generally designated by the reference number 10 will be described.

The present one side breathing hole massage cushion 10 has been designed to enable a user to perform Thai massage, or Shiatsu massage upon a prone or supine position, so that the clients feel comfortable especially in prone position like in a massage table, because there is a breathing hole (4) on the fabric case (1) and filler (6). The air channel (4,5) is not vertically placed, instead, it is a horizontal air channel, with the breathing air running from the round pit (4) to a horizontal ditch(5), and finally gets out from the airholes (9) assembled on the top side of the fabric case (1)

The present one side breathing hole massage cushion (10) comprises two independent components: The trifold fabric case (1,2,3), and three separated fillers. (6,7,8)

What is claimed is:

1. A one-side breathing hole massage cushion for use in massage treatment, said one-side breathing hole massage cushion comprising:

(A) A tri-fold cloth bag, comprising three separate small cloth bags, the small cloth bags being connected to adjacent small cloth bags by cloth pieces, and a first one of the small cloth bags being configured for an upper body of a user having a round hole on one side;

(B) Three separate fillers, wherein a first one of the fillers is configured for the user's upper body has a horizontal air channel.

2. The one-side breathing hole massage cushion claim 1, wherein the round hole on the first cloth bag is configured to be located at a head of the user, and the first one of the small cloth bags comprises at least two stainless steel eyeholes assembled at a front side of the first cloth bag.

3. The one-side breathing hole massage cushion claim 1, wherein the first one of the fillers further comprises:

a round pit at a same location with the round hole; and a horizontal ditch connected to the round pit, which forms a horizontal air channel.

* * * * *